United States Patent
Maeda et al.

(10) Patent No.: US 7,516,003 B2
(45) Date of Patent: Apr. 7, 2009

(54) VEHICLE STEERING SYSTEM

(75) Inventors: Naoki Maeda, Kashihara (JP); Kosuke Yamanaka, Kashiwara (JP); Masanori Arima, Nara (JP); Atsushi Ishihara, Yamatokoriyama (JP); Tatsuma Kouchi, Kashiwara (JP); Shingo Maeda, Kashiwara (JP); Daisuke Maeda, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 11/758,902

(22) Filed: Jun. 6, 2007

(65) Prior Publication Data

US 2007/0288142 A1 Dec. 13, 2007

(30) Foreign Application Priority Data

Jun. 7, 2006 (JP) ............................. 2006-158549

(51) Int. Cl.
- *B62D 6/00* (2006.01)
- *B62D 1/00* (2006.01)
- *B62D 15/00* (2006.01)

(52) U.S. Cl. ............................. 701/41; 701/42; 701/43; 180/204; 180/6.24

(58) Field of Classification Search ............. 701/41–43, 701/301, 23, 300; 180/170, 204, 443, 446
See application file for complete search history.

(56) References Cited

U.S. PATENT DOCUMENTS

| | | | |
|---|---|---|---|
| 5,765,116 A * | 6/1998 | Wilson-Jones et al. | 701/41 |
| 6,198,992 B1 * | 3/2001 | Winslow | 701/23 |
| 6,212,452 B1 | 4/2001 | Shimizu et al. | |
| 6,272,418 B1 * | 8/2001 | Shinmura et al. | 701/72 |
| 6,408,236 B2 * | 6/2002 | Nishiwaki et al. | 701/41 |
| 6,493,619 B2 * | 12/2002 | Kawazoe et al. | 701/41 |
| 6,691,008 B2 * | 2/2004 | Kondo et al. | 701/41 |
| 6,907,333 B2 * | 6/2005 | Iwazaki | 701/41 |
| 7,177,760 B2 * | 2/2007 | Kudo | 701/209 |
| 2001/0016798 A1 * | 8/2001 | Kodaka et al. | 701/301 |
| 2002/0016657 A1 | 2/2002 | Iwazaki | |

(Continued)

FOREIGN PATENT DOCUMENTS

EP 1 508 505 A2 2/2005

(Continued)

OTHER PUBLICATIONS

U.S. Appl. No. 11/758,902, filed Jun. 6, 2007, Maeda, et al.

(Continued)

*Primary Examiner*—Jack W. Keith
*Assistant Examiner*—Matthew Lichti
(74) *Attorney, Agent, or Firm*—Oblon, Spivak, McClelland, Maier & Neustadt, P.C.

(57) ABSTRACT

A vehicle steering system includes: a steering actuator that imparts a steering force to a steering mechanism of a vehicle; an automatic steering controller that performs an automatic steering control by controlling the steering actuator; a driving state detector that detects a driving state of the vehicle during the automatic steering control; a threshold value setting unit that variably sets a threshold value for permitting an intervention in the automatic steering control; and an automatic steering intervention unit that intervenes in the automatic steering control based on a threshold value set by the threshold value setting unit.

4 Claims, 4 Drawing Sheets

U.S. PATENT DOCUMENTS

| | | | |
|---|---|---|---|
| 2004/0098197 A1* | 5/2004 | Matsumoto et al. | 701/301 |
| 2005/0071084 A1* | 3/2005 | Knoop et al. | 701/301 |
| 2005/0205345 A1 | 9/2005 | Hayashi | |
| 2006/0089770 A1* | 4/2006 | Ito | 701/41 |
| 2007/0162206 A1* | 7/2007 | Tamaizumi | 701/41 |
| 2007/0168093 A1* | 7/2007 | Nishiyama | 701/41 |
| 2007/0233343 A1* | 10/2007 | Saito et al. | 701/41 |
| 2007/0233386 A1* | 10/2007 | Saito et al. | 701/300 |
| 2007/0282502 A1* | 12/2007 | Bayer et al. | 701/42 |

FOREIGN PATENT DOCUMENTS

| | | |
|---|---|---|
| EP | 1 650 101 A2 | 4/2006 |
| JP | 2001-138941 | 5/2001 |
| JP | 2004-284530 | 10/2004 |

OTHER PUBLICATIONS

U.S. Appl. No. 11/760,402, filed Jun. 8, 2007, Maeda, et al.
U.S. Appl. No. 11/760,311, filed Jun. 8, 2007, Arima, et al.
U.S. Appl. No. 11/760,206, filed Jun. 8, 2007, Arima, et al.

* cited by examiner

VEHICLE STEERING SYSTEM

BACKGROUND OF THE INVENTION

The present invention relates to a vehicle steering system which can perform an automatic steering control and cancel the control.

There are proposed techniques for performing an automatic steering of a vehicle by making use of a steering actuator provided on the vehicle. For example, a power steering system installed on a vehicle includes an electric motor or a hydraulic actuator as a steering actuator for imparting a steering force (a steering assist force) to a steering mechanism. Then, steered road wheels of the vehicle can be turned without involving the manipulation of a steering wheel by the driver by controlling the output of the steering actuator.

More specifically, in an automatic parking assist control, a target traveling path from a current position to a parking position of the vehicle is calculated, and a relationship of a target turning angle with a traveling distance of the vehicle is obtained so that the vehicle is reversed along the target traveling path so calculated. Then, the steering actuator is controlled so as to attain a target turning angle according to a traveling distance of the vehicle. As this occurs, the driver only has to perform the adjustment of stopping position as well as the adjustment of vehicle speed by controlling the brake and accelerator pedals and does not have to manipulate the steering wheel.

In the case that a human being or obstacle such as a moving object other than the human being happens to enter the target traveling path of the vehicle after the vehicle has started reversing, the driver can intervene in the automatic parking control by not only applying the brakes but also imparting a manipulating torque to the steering wheel. As this occurs, it is detected that the manipulating torque imparted to the steering wheel exceeds a predetermined torque threshold value, in response to which the automatic parking control is canceled (see JP-A-2004-284530, for example). In addition to this, the automatic parking control can be canceled according to the intention of the driver by manipulating a predetermined switch which activates the stop of automatic parking control.

When the automatic parking control is performed, there may occur a case where the steering wheel rotates fast depending upon adjustment of the vehicle speed by the driver, an approaching angle to the parking position or a target traveling path. Although there is caused no problem when the rotational speed of the steering wheel is low, in the case that the steering wheel rotating at faster speeds strike the hand or fingers of the driver, the driver may feels uncomfortableness. In particular, during the automatic parking control, the driver adjusts the vehicle speed while looking backwards. When the steering wheel rotating at faster speeds strike the hand or fingers of the driver in such a situation, the driver is astonished by an abrupt impact he or she is given. Although the manipulating torque exceeds the torque threshold value to thereby cancel the automatic parking control when the hand or fingers of the driver are caught by the rotating steering wheel, causing nothing dangerous to the driver, he or she cannot escape from having to sense the feeling of uncomfortableness due to the abrupt impact.

In the related art like this, the intervention in automatic steering control is not always performed properly.

SUMMARY OF THE INVENTION

An object of the invention is to provide a vehicle steering system which can properly set a threshold value for permitting an intervention in automatic steering control to thereby permit a proper intervention in automatic steering control according to the operating speed of the control member and other driving states of the vehicle.

With a view to attaining the object, according to a first aspect of the invention, there is provided a vehicle steering system including a steering actuator (M) for imparting a steering force to a steering mechanism (1) of a vehicle, an automatic steering controller (22) for performing an automatic steering control by controlling the steering actuator, a driving state detector (11, 25) for detecting a driving state of the vehicle during the automatic steering control by the automatic steering controller, a threshold value setting unit (S1, S2, S5; S11) for variably setting a threshold value (TH) for permitting an intervention in the automatic steering control by the automatic steering controller, and an automatic steering intervention unit (24, 29, S3, S4, S6, S7; S12, S13) for intervening in the automatic steering control by the automatic steering controller based on a threshold value set by the threshold value setting unit. Note that parenthesized alphabetical character, alphabetical characters with numbers and numbers indicate corresponding constituent elements in an embodiment which will be described later on.

According to the configuration of the first aspect of the invention, the threshold value at which the intervention in the automatic steering control is permitted is variably set according to the driving state of the vehicle which is under automatic steering control, whereby the intervention in the automatic steering control can be permitted properly according to the driving state of the vehicle, so that, for example, causing the driver to sense the feeling of uncomfortableness can be suppressed or prevented, thereby making it possible to improve the steering feeling.

The automatic steering intervention unit may be such as to cancel the automatic steering control by the automatic steering controller or may be such as to forcibly change the mode of automatic steering control by the automatic steering controller.

The driving state detector may be such as to detect the operating state (the steering angle, steering speed and the like) of the steering mechanism which is under automatic steering control, may be such as to detect the operating state (the operating amount, operating speed and the like) of a control member for controlling the steering direction of the vehicle when the steering mechanism is linked with the control member or may be such as to detect the speed (the vehicle speed) of the vehicle which is under automatic steering control.

According to a second aspect of the invention, there is provided a vehicle steering system as set forth in the first aspect of the invention, including further a control member (5) linked with the steering mechanism, and a torque detector (11) for detecting a manipulating torque that is applied to the control member, wherein the threshold value setting unit is such as to variably set a torque threshold value for permitting an intervention in the automatic steering control, and wherein the automatic steering intervention unit is such as to intervene in the automatic steering control by the automatic steering controller when a manipulating torque detected by the torque detector exceeds a torque threshold value set by the threshold value setting unit.

According to the configuration of the second aspect of the invention, when the manipulating torque is imparted to the control member and the manipulating torque so imparted exceeds the torque threshold value, the intervention in the automatic steering control is permitted. Consequently, in the case that the driver attempts to intervene in the automatic steering control by manipulating intentionally the control member, or in the case that the hand, fingers or other part constituting an obstacle of the driver is caught by the control member, the automatic steering control can be cancelled or the mode of the automatic steering control can be changed forcibly. Moreover, since the torque threshold value is variably set according to the driving state of the vehicle, a proper torque threshold value can be set according to the driving state of the vehicle which is under automatic steering control. By being configured like this, in the case that the driver attempts to intervene the automatic steering control or the hand, fingers or other part constituting an obstacle of the driver is caught by the control member, since the uncomfortableness the driver is caused to feel can be reduced, the steering feel can be improved.

The steering mechanism and the control member may be linked with each other mechanically, or the steering mechanism and the control member may be put into a relationship in which the steering mechanism and the control member are linked with each other through electric control although they are not in a relationship in which the operation of one of them is mechanically transmitted to the other.

According to a third aspect of the invention, there is provided a vehicle steering system as set forth in the second aspect of the invention, wherein the driving state detector includes an operation speed detector (25) for detecting the operation speed of the control member, and wherein the threshold value setting unit is such as to determine a torque threshold value in such a manner as to become smaller as the operation speed detected by the operation speed detection nit becomes faster.

According to the configuration of the third aspect of the invention, in the case that the steering mechanism is controlled to perform a steering operation as a result of the automatic steering control and the control member is caused to operate due to being linked with the steering mechanism which is performing the steering operation, the torque threshold value is variably set according to the operation speed of the control member. Specifically, the torque threshold value is set smaller as the operation speed of the control member becomes faster, whereby since, in the case that the control member operates at high speeds by virtue of the automatic steering control, the intervention in the automatic steering control is permitted with a relatively small torque threshold value, the automatic steering control can be cancelled as soon as possible or the mode of the automatic steering control can be modified forcibly before a large impact is given to the driver even though the driver is brought into contact with the control member, whereby the steering feel can be improved.

The operation speed detector may be such as to include a manipulating angular velocity detector for detecting an angular velocity at which a steering wheel is manipulated in the case that the control member takes the form of the steering wheel.

According to a fourth aspect of the invention, there is provided a vehicle steering system as set forth in the third aspect of the invention, wherein the automatic steering intervention unit includes an operation speed limiting unit (29) for intervening in the automatic steering control by the automatic steering controller in the case that the operation speed (ωth) detected by the operation speed detector exceeds a predetermined speed threshold value so as to limit the operation speed of the control member to be equal to or lower than the speed threshold value.

According to the configuration of the fourth aspect of the invention, when the operation speed of the control member which is linked with the steering mechanism under automatic steering control exceeds the speed threshold value, the operation speed limiting unit intervenes in the automatic steering control to change the mode of the automatic steering control forcibly so that the operation speed of the control member becomes equal to or lower than the speed threshold value. By being configured like this, since the operation speed of the control member is limited to be equal to or lower than the speed threshold value, in the case that the driver contacts the control member, causing the driver to sense the feeling of physical disorder in manipulating the control member largely can be suppressed or prevented, thereby making it possible to improve the steering feel. In addition, the danger of the hand, fingers or other part constituting an obstacle of the driver being caught by the control member can be reduced.

According to a fifth aspect of the invention, there is provided a vehicle steering system as set forth in the fourth aspect of the invention, wherein the operation speed limiting unit is such as to intervene in the automatic steering control by the automatic steering control means so as to limit the operation speed of the control member to be equal to or lower than the speed threshold value when a manipulating torque detected by the torque detector exceeds a torque threshold value set by the threshold value setting means in the case that an operation speed detected by the operation speed detector exceeds the speed threshold value.

According to the configuration of the fifth aspect of the invention, when the operation speed of the control member exceeds the speed threshold value and the manipulating torque exceeds the torque threshold value, the mode of the automatic steering control is forcibly changed so that the operation speed of the control member is limited to be equal to or lower than the speed threshold value. Consequently, in the case that the driver intentionally imparts the manipulating torque to the control member or in the case that the hand, fingers or other part constituting an obstacle of the driver strikes the control member, the automatic steering control is intervened in so as to realize the reduction in the feeling of physical disorder sensed by the driver in manipulating the control member while suppressing the intervention in the automatic steering control as much as possible.

According to a sixth aspect of the invention, there is provided a vehicle steering system as set forth in the fourth or fifth aspect of the invention, wherein the automatic steering intervention unit includes further a unit (S4) for canceling the automatic steering control by the automatic steering controller when a manipulating torque detected by the torque detector exceeds a torque threshold value set by the threshold value setting means in the case that an operation speed detected by the operation speed detector is lower than the speed threshold value.

According to the configuration of the sixth aspect of the invention, in the case that the operation speed of the control member is relatively slow, when the manipulating torque exceeds the torque threshold value which is set relatively large by the threshold setting unit, the automatic steering control is cancelled. In the case that the operation speed of the control member is slow, the danger of the hand or fingers of the driver being caught by the control member is small, and even though the hand or fingers of the driver are brought into contact with the control member, there is caused no fear that the driver is given a large impact. Then, in the case that the operation speed of the control member is slow, the torque threshold value is set relatively large, and in the case that the manipulating torque which exceeds the torque threshold value so set is imparted to the control member, judging that the driver intentionally intervenes in the automatic steering control or there is a possibility that the hand or fingers of the driver are caught by the control member, the automatic steering control is cancelled. On the other hand, since the operation speed of the control member is limited to be equal to or lower than the speed threshold value, even though the driver contacts the control member, the driver is given a large impact in no case. Furthermore, with this aspect of the invention combined with the fourth aspect thereof, since an intervention is made to automatic steering control so as to limit the operation speed of the control member to be equal to or lower than the speed threshold value on condition that the manipulating torque exceeds a relatively small torque threshold value when the control member operates quickly, the intervention by the driver can be permitted properly while suppressing the intervention in the automatic steering control to a minimum level, and additionally, imparting a large impact to the hand or fingers of the driver can be suppressed or prevented.

DETAILED DESCRIPTION OF PREFERRED EMBODIMENTS

Hereinafter, embodiments of the invention will be described in detail with reference to the accompanying drawings.

Figure 1:
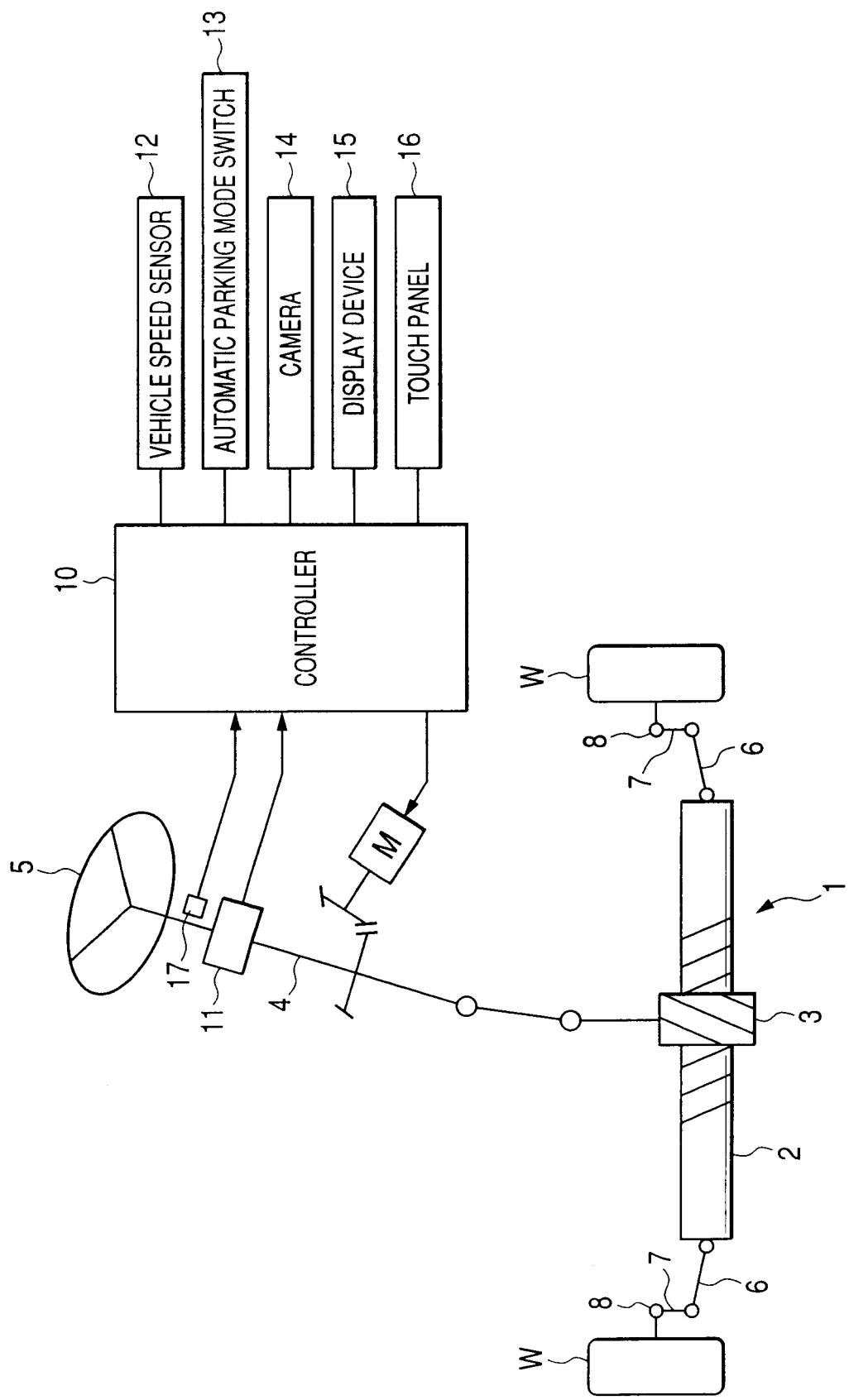
FIG. 1 is a conceptual diagram which describes the configuration of an electric power steering system which is a vehicle steering system according to an embodiment of the invention.

FIG. 1 is a conceptual diagram which describes a configuration of an electric power steering system which is a vehicle steering system according to an embodiment of the invention. The electric power steering system is configured such that torque generated by an electric motor M functioning as a steering actuator is transmitted to a steering mechanism 1 for turning steered road wheels W (for example, left and right front road wheels) of a vehicle. The steering mechanism 1 is a rack-and-pinion type steering mechanism which includes a rack shaft 2 which extends along a lateral direction of the vehicle and a pinion 3 which meshes with a gear portion of the rack shaft 2. One end of a steering shaft 4 is connected to the pinion 3, and a steering wheel 5 functioning as a control member is connected to the other end of the steering shaft 4. Consequently, when the steering wheel 5 is manipulated to rotate, the rotation of the steering wheel 5 is transmitted to the rack shaft 2 via the steering shaft 4 and the pinion 3 so as to be transformed into an axial displacement of the rack shaft 2.

Ends of a pair of tie rods 6 are connected to ends of the rack shaft 2, respectively. The other ends of the pair of tie rods 6 are connected to ends of a pair of knuckle arms 7, respectively. The pair of knuckle arms 7 are supported rotatably around a pair of king pins 8, respectively, and are connected to the pair of steered road wheels W via the king pins 8, respectively. In this configuration, when the rack shaft 2 is displaced in an axial direction, the knuckle arms 7 rotate around the king pins 8, respectively, whereby the steered wheels are turned.

In order to impart a proper steering force to the steering mechanism 1, a controller (an ECU: Electronic Control Unit) 10 is provided for controlling the electric motor M. The controller 10 is designed to receive output signals which are inputted thereinto from a torque sensor 11 for detecting a manipulating torque imparted to the steering wheel 5, a manipulating angle sensor 17 for detecting a manipulating angle of the steering wheel 5 by detecting a rotational angle of the steering shaft 4 and a vehicle speed sensor 12 for detecting a vehicle speed of the vehicle on which the electric power steering system is installed. An output of an automatic parking mode switch 13 for setting and canceling an automatic parking mode is further given to the controller 10. A video signal is inputted into the controller 10 from a camera 14 for sensing an image at the rear of the vehicle. Furthermore, a display device 15 (for example, a liquid crystal display device or other graphic display device) which is disposed in the vicinity of a driver's seat of the vehicle is connected to the controller 10, and an output signal of a touch panel 16 provided on a display screen of the display device 15 is designed to be inputted into the controller 10.

When the automatic parking mode is instructed by manipulation of the automatic parking mode switch 13, the controller 10 controls the electric motor M according to the automatic parking mode in which a steering control (an automatic parking control) is performed for automatic parking of the vehicle. When a cancellation of the automatic parking mode is instructed by manipulation of the automatic parking mode switch 13, the controller 10 cancels the automatic parking control and controls the electric motor M according to an assist mode. The assist mode means a control mode for causing the electric motor M to generate a steering assisting force to assist the driver in manipulating the steering wheel 5 based on a manipulating torque detected by the torque sensor 11 and a vehicle speed detected by the vehicle speed sensor 12.

Figure 2:
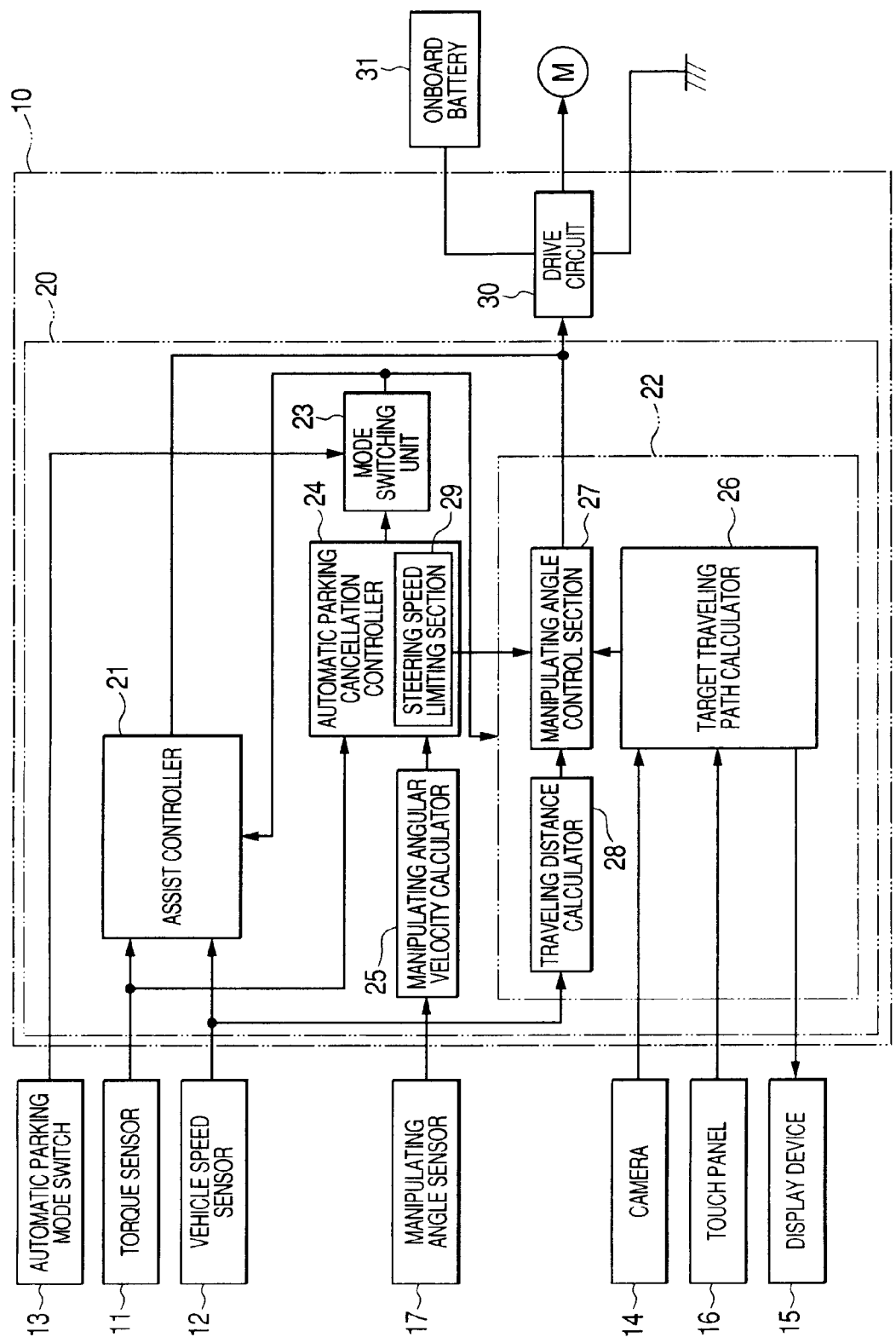
FIG. 2 is a block diagram which describes an electrical configuration of a controller provided in the vehicle steering system.

FIG. 2 is a block diagram which describes an electrical configuration of the controller 10. The controller 10 includes a microcomputer 20 and a drive circuit 30 for supplying electric power from an onboard battery 31 to the electric motor M.

The microcomputer 20 includes a CPU (Central Processing Unit) and a memory (ROM, RAM and the like) and performs functions of a plurality of functional processing units. The functional processing units include an assist controller 21 for controlling the electric motor M according to the assist mode, an automatic parking controller 22 for controlling the electric motor M according to the automatic parking mode, a mode switching unit 23 for switching the mode of the electric power steering system between the automatic parking mode and the assist mode, an automatic parking cancellation controller 24 for canceling the automatic parking control by the automatic parking controller 22 so as to shift the mode of the electric power steering system from the automatic parking mode to the assist mode when a predetermined condition is established, and a manipulating angular velocity calculator 25 for calculating a manipulating angular velocity which is a time differential value of a manipulating angle outputted by the manipulating angle sensor 17.

The mode switching unit 23 selects a control by either of the assist controller 21 or the automatic parking controller 22 and makes the control so selected effective, whereby the automatic parking mode and the assist mode are switched therebetween. This mode switching unit 23 not only switches the control mode according to the setting by the automatic parking mode switch 13 but also switches the control mode from the automatic parking mode to the assist mode according to an instruction from the automatic parking cancellation controller 24 during the automatic parking mode.

The automatic parking cancellation controller 24 determines whether or not the automatic parking control is to be cancelled based on a manipulating torque detected by the torque sensor 11 and a manipulating angular velocity calculated by the manipulating angular velocity calculator 25 and gives to the mode switching unit 23 an automatic parking cancellation instruction which instructs the unit to cancel the automatic parking mode when the automatic parking mode is to be cancelled. More specifically, the automatic parking cancellation controller 24 issues the automatic parking cancellation instruction when the manipulating angular velocity is equal to or lower than a speed threshold value $\omega$th and an absolute value of the manipulating torque exceeds a first threshold value TH1 higher than zero.

The automatic parking cancellation controller 24 includes a steering speed limiting unit 29 for limiting a steering speed under the automatic parking control when the automatic parking mode is in operation. This steering speed limiting unit 29 determines whether or not the automatic parking control by the automatic parking controller 22 should be intervened in based on the manipulating angular velocity and the manipulating torque and gives to the automatic parking controller 22 an instruction which instructs the controller to intervene in the automatic parking control when necessary. More specifically, the steering speed limiting unit 29 issues to the automatic parking controller 22 the instruction to limit the steering speed to be equal to or lower than the speed threshold value $\omega$th when the absolute value of the manipulating torque exceeds a second threshold value TH2 which is smaller than the first threshold value TH1 ($0<TH2<TH1$) in the case that the manipulating angular velocity exceeds the speed threshold value $\omega$th.

The assist controller 21 determines a motor target current value which corresponds to a manipulating torque detected by the torque sensor 11 and a vehicle speed detected by the vehicle speed sensor 12. More specifically, the assist controller 21 sets a motor target current value according to an assist characteristic which decides a motor target current value with respect to the manipulating torque and the vehicle speed and controls the electric motor M via the drive circuit 30 so that the motor target current value is attained. The assist characteristic is stored in advance in the memory within the microcomputer 20 in the form of a map (a table), for example. This assist characteristic is provided such that for example, the motor target current value can be set larger as the absolute value of the manipulating torque becomes larger and the motor target current value can be set smaller as the vehicle speed becomes faster.

The automatic parking controller 22 includes a target traveling path calculator 26 for calculating a target traveling path from a current position to a target parking position of the vehicle, a steering angle control section 27 for controlling a steering angle according to the target traveling path calculated by the target traveling path calculator 26, and a traveling distance calculator 28 for calculating a traveling distance based on an output signal of the vehicle speed sensor 12.

The target traveling path calculator 26 calculates a target traveling path based on a video image sensed by the camera 14 and an input from the touch panel 16. More specifically, when the driver manipulates the automatic parking mode switch 13 to designate the automatic parking mode, a video image outputted by the camera 14 is displayed on the display device 15. Then, the driver designates a desired parking position from the touch panel 16 by referring to the video image displayed on the display device 15. Consequently, in this case, the touch panel 16 functions as a parking position designation device. When the parking position is designated in this way, the target traveling path calculator 26 calculates a positional relationship between the current position of the subject vehicle and the designated parking position and obtains a path which avoids an obstacle that is recognized by the video image sensed by the camera 14 as a target traveling path. The traveling path so calculated may be displayed on the display device 15.

The target traveling path calculator 26 stores information on the target traveling path in the memory in the form of steering control table data which is table data which represents a relationship between a traveling distance over which the vehicle travels from the current position to the target parking position thereof and a steering angle which corresponds to the traveling distance. The steering angle control section 27 controls the electric motor M by referring to the steering control table data. Namely, the steering angle control section 27 obtains steering angle data corresponding to a traveling distance of the vehicle which is inputted from the traveling distance calculator 28 from the steering control table data based on the traveling distance. The steering angle control section 27 controls the electric motor M via the drive circuit 30 so that the steering angle data is attained so obtained.

During the automatic parking is being performed, basically, the driver does not manipulate the steering wheel 5 but manipulates an accelerator pedal and a brake pedal so as to adjust the speed of the vehicle and adjusts a stopping position. During this operation, the steering angle of the steering mechanism 1 is automatically adjusted moment by moment by the electric motor M controlled by the automatic parking controller 22.

There may occur a case where the steering angle of the steering mechanism 1 has to be changed quickly depending upon the adjustment of the vehicle speed by the driver or an approaching angle to the parking position. As this occurs, not only does the steering speed of the steering mechanism 1 become fast but also the manipulating angular velocity of the steering wheel 5, which is mechanically connected to the steering mechanism 1, which is the rotational angular velocity thereof also becomes fast. In these situations, when the steering wheel 5 strikes the hand, fingers of other part constituting an obstacle of the driver, a rise in steering torque is detected, and the steering speed controller 29 interferes with the control of the automatic parking controller 22 and limits the steering speed of the steering mechanism 1.

Figure 3:
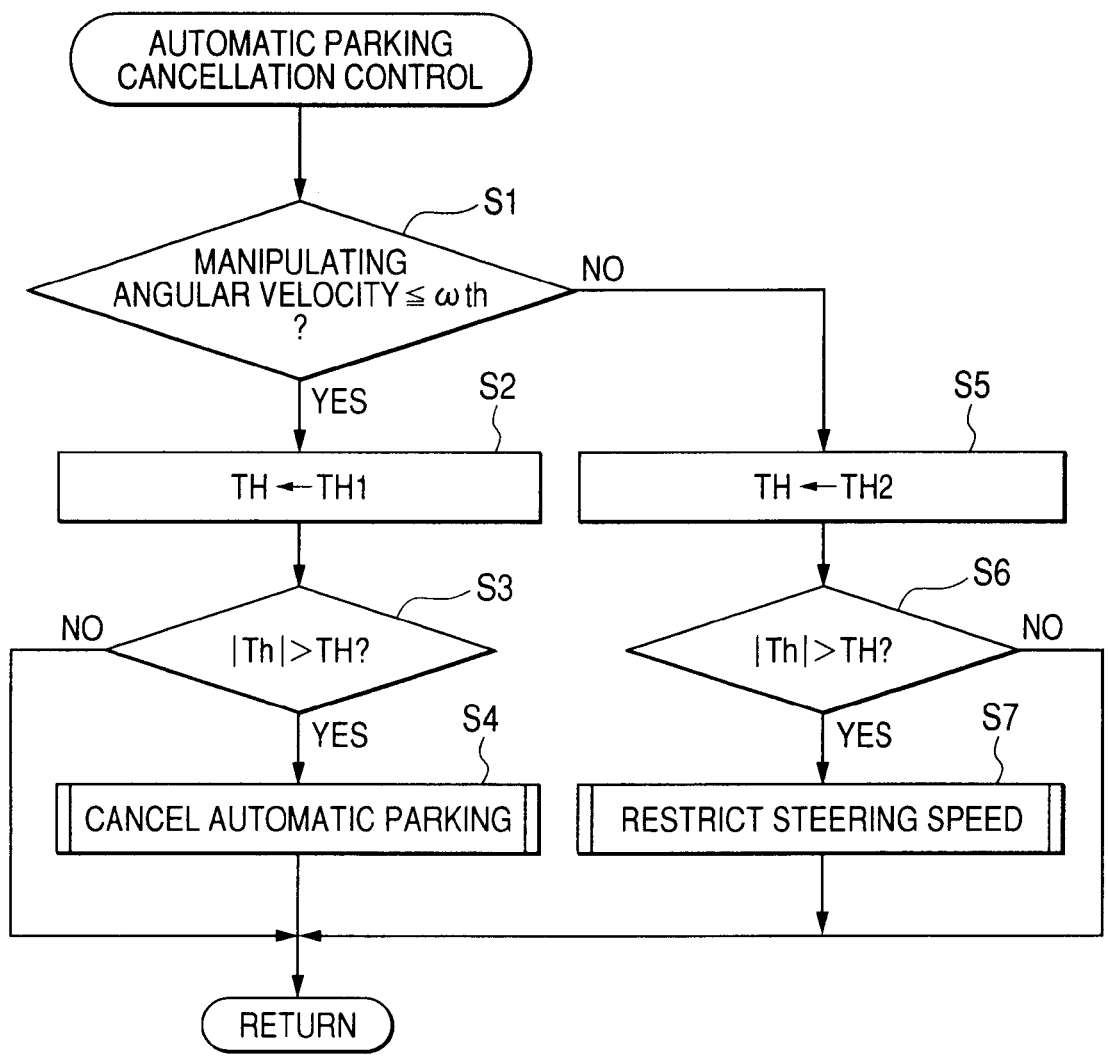
FIG. 3 is a flowchart which describes the operation of an automatic parking cancellation control section provided in the controller.

FIG. 3 is a flowchart which describes an operation which is performed repeatedly on a predetermined control cycle by the automatic parking cancellation controller 24 during the automatic parking mode. Firstly, the automatic parking cancellation controller 24 judges whether or not the rotation of the steering wheel 5 is fast. Namely, the automatic parking cancellation controller 24 judges whether or not a manipulating angular velocity that is obtained by the manipulating angular velocity calculator 25 is equal to or lower than the predetermined speed threshold value $\omega$th (step S1). If the manipulating angular velocity is equal to or lower than the speed threshold value $\omega$th (step S1: YES), the automatic parking cancellation controller 24 sets a torque threshold value TH to the first threshold value TH1 higher than zero (step S2) and then judges whether or not an absolute vale of a manipulating torque Th that is detected by the torque sensor 11 exceeds the torque threshold value TH (step S3). If the absolute value of the manipulating torque Th exceeds the torque threshold value TH (step S3: YES), it is judged that the driver is imparting a manipulating torque to the steering wheel 5 or there exists a possibility that the hand, finger or other part constituting an obstacle of the driver is caught by the steering wheel 5, and the automatic parking cancellation controller 24 gives to the mode switching unit 23 an automatic parking cancellation instruction (step S4). In response to the instruction so given, the mode switching unit 23 switches the control mode from the automatic parking mode to the assist mode. If the manipulating torque Th does not exceed the torque threshold value TH (step S3: NO), the automatic parking cancellation controller 24 does not issue the automatic parking cancellation instruction but causes the automatic parking mode to continue.

In the case that the steering angle of the steering mechanism 1 is caused to change at high speeds by the electric motor M and the steering wheel 5 rotates at high speeds in response thereto, instep S1, the manipulating angular velocity is judged to exceed the speed threshold value ωth (step S1: NO). As this occurs, the automatic parking cancellation controller 24 sets the torque threshold value TH to the second threshold value TH2 which is smaller than the first threshold value TH1 (0<TH2<TH1) (step S5). The steering speed limiting section 29 uses this smaller threshold value TH2 as the torque threshold value TH so as to judge whether or not the absolute value of the manipulating torque Th that is detected by the torque sensor 11 exceeds the torque threshold value TH (step S6). If the absolute value of the manipulating torque Th exceeds the torque threshold value TH (step S6: YES), it is judged that the driver is imparting the manipulating torque to the steering wheel 5 or there is a possibility that the hand, fingers or other part constituting an obstacle of the driver is in contact with the steering wheel 5, whereby the steering speed limiting section 29 issues a steering speed limiting instruction to the steering angle control section 27 of the automatic parking controller 22 (step S7). In response to this, the steering angle control section 27 controls the electric motor M so that the steering angle changes within a range of steering speed in which the manipulating angular velocity of the steering wheel 5 becomes equal to or lower than the speed threshold value ωth. In this case, for example, the automatic parking controller 22 may limit the steering speed while performing a steering angle control which follows the target traveling path by limiting the vehicle speed by intervening in the acceleration control and/or brake control. Namely, since the changing speed of the steering angle relative to the traveling distance of the vehicle can be mitigated by limiting the vehicle speed, the steering speed can be limited. The steering speed limiting section 29 forcibly causes the mode of the automatic parking control executed by the automatic parking controller 22 to change by imparting the steering speed limiting instruction to the automatic parking controller 22 in this way.

On the other hand, if the absolute value of the manipulating torque Th does not exceed the torque threshold value TH (step S6: NO), the steering speed control section 29 does not issue the steering speed limiting instruction, and therefore, the control by the automatic parking controller 22 is not intervened in, whereby the automatic parking mode is allowed to continue.

In this way, according to the embodiment, in the case that the manipulating angular velocity is slow while the automatic parking mode is in operation, the torque threshold value TH is set to the relatively large first threshold value TH1, so as to cancel the automatic parking control when the manipulating torque exceeds the first threshold value TH1. In case the rotational speed of the steering wheel 5 is slow, there is little danger of the hand or fingers of the driver being caught by the steering wheel 5, and even if the hand or fingers of the driver be caught by the steering wheel 5, since a large impact is not generated in no case, there is no possibility that catching the hand or fingers of the driver in such a way directly leads to a dangerous state. Then, by using the relatively large first threshold value TH1, the automatic parking mode is not made to be cancelled improperly and the automatic parking mode is made to be cancelled in the case that the driver intentionally applies a large manipulating torque to the steering wheel 5 to intervening in the automatic parking or the hand or fingers of the driver are caught by the steering wheel 5.

On the other hand, in the case that the manipulating angular velocity is fast in the automatic parking mode, the torque threshold value TH is set to the relatively small second threshold value TH2. Thus, in the case that the driver intervenes in the automatic parking control or the steering wheel 5 strikes the hand or fingers of the driver, a restriction can be imposed on the steering speed, whereby an impact to the driver can be mitigated and the danger of the hand or fingers of the driver being caught by the steering wheel 5 can be avoided effectively. In addition, after the restriction has been imposed on the steering speed, since a state results in which the manipulating angular velocity is judged as being equal to or lower than the speed threshold value ωth in step S1 in FIG. 3, the automatic parking mode is not cancelled improperly except when it is necessary to cancel it to deal with the case where the driver intentionally applies the large manipulating torque to the steering wheel 5 so as to intervene in the automatic parking control or the hand or fingers of the driver are caught by the steering wheel 5.

In this way, the danger of the hand or fingers of the driver being caught by the steering wheel 5 can be avoided effectively, and the improper cancellation of the automatic parking mode can be suppressed or prevented while reducing the impact given to the driver so as to improve the steering feel.

Figure 4:
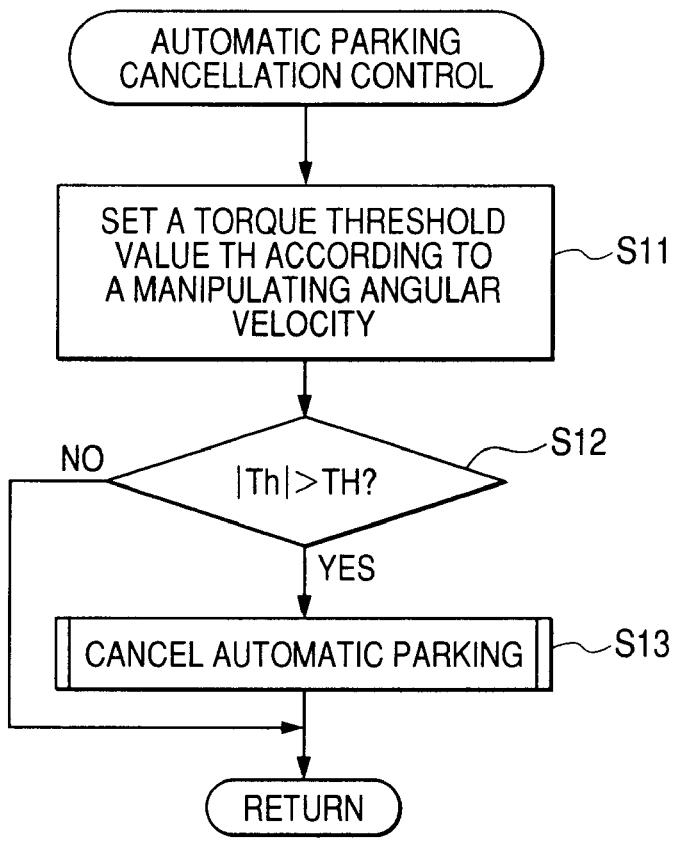
FIG. 4 is a flowchart which describes the operation of a second embodiment of the invention, in which a control for canceling an automatic parking mode is shown.

FIG. 4 is a flowchart which describes the operation of a second embodiment of the invention and in which a control for canceling the automatic paring mode is shown. In the description of this embodiment, FIGS. 1 and 2 will be referred to again. In this embodiment, however, a steering speed limiting section 29 is not necessary to be provided in an automatic parking cancellation controller 24.

In this embodiment, the automatic parking cancellation controller 24 variably sets a torque threshold value TH according to a manipulating angular velocity that is obtained by a manipulating angular velocity calculator 25 (step S11) and gives an automatic parking cancellation instruction to a mode switching unit 23 (step S13) in the case that an absolute value of a manipulating torque Th exceeds the torque threshold value TH (step S12: YES). If the absolute value of the manipulating torque Th is equal to or lower than the torque threshold value TH (step S12: NO), the automatic parking control is allowed to continue.

Figure 5:
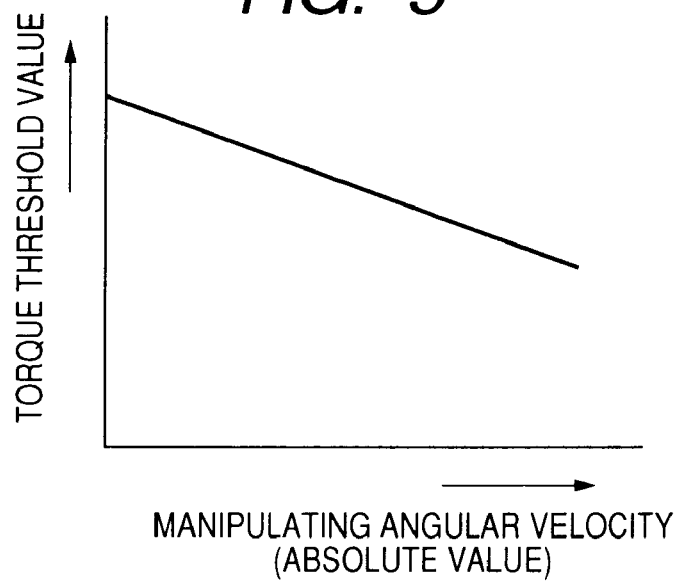
FIG. 5 is a diagram which describes a variable setting example of a torque threshold value in the second embodiment.

FIG. 5 is a diagram which describes a variable setting example of the torque threshold value TH in step S11. The torque threshold value TH is determined to decrease from a predetermined upper limit value to a lower limit value as the manipulating angular velocity (the absolute value) increases higher. In this embodiment, while the torque threshold value TH is made to decrease linearly as the manipulating angular velocity increases, the torque threshold value TH may be made to decrease along a predetermined curve.

By setting the torque threshold TH in such a manner as to decrease as the manipulating angular velocity increases in this way, the automatic parking control can be cancelled properly while suppressing the uncomfortable feeling sensed by the driver in the case that the driver contacts the steering wheel 5 during automatic parking control.

For example, when the steering wheel 5 is rotating at low speeds under automatic parking control, there is caused no danger even though the driver contacts the steering wheel 5, and there is no case where a large impact is given to the driver. Then, the torque threshold value TH is set relatively large, whereby in the case that the driver intentionally intervenes in the automatic parking control or the hand or fingers of the driver are caught by the steering wheel 5, the automatic parking control can be canceled, while in the case that the hand or fingers of the driver simply strike the steering wheel 5, the improper cancellation of the automatic parking control can be suppressed or prevented.

In addition, in the case that the steering wheel 5 is being rotated at high speeds under automatic parking control, in order for the impact generated when the driver contacts the steering wheel 5 to be suppressed, the torque threshold value TH is set relatively small. With this, the steering feel can be improved, and even when the steering wheel 5 is being rotated at high speeds, the automatic parking control can be cancelled promptly in the case that the driver intentionally intervenes in the automatic parking control or in the case that the hand, fingers or other part constituting an obstacle of the driver is caught by the steering wheel 5.

Thus, while the two embodiments of the invention have been described heretofore, the invention can be implemented in other forms. For example, while in the first embodiment, the steering speed during automatic parking is made to be limited when the absolute value of the manipulating torque exceeds the second threshold value TH2 in the case that the manipulating angular velocity exceeds the speed threshold value ωth, the automatic parking control may be made to be cancelled in place of limiting the steering speed.

In addition, while in the embodiments, in order to detect the operation speed of the steering wheel 5 as the control member, the manipulating angle sensor 17 is provided to calculate the manipulating angular velocity, the detection of the operating speed of the steering wheel 5 can be implemented by utilizing, for example, a rack travel amount sensor for detecting a travel amount of the rack shaft 2, and additionally, the relevant detection can also be implemented by detecting the rotational speed of the electric motor M.

In addition, while in the embodiments, the torque threshold at which the automatic parking control is intervened in is changed according to the detected manipulating angular velocity of the steering wheel 5, the torque threshold value may be changed according to other driving states such as the vehicle speed of the vehicle which is under automatic parking control by detecting such other driving states. More specifically, since the vehicle speed is closely related to the manipulating angular velocity of the steering wheel 5, in the case that the vehicle speed exceeds the predetermined vehicle speed threshold value, the mode of the automatic parking control may be forcibly changed in such a manner as to restrict the manipulating angular velocity.

Furthermore, an abnormality detector may be provided for detecting the abnormality of the electric power steering system. In the case that abnormality (abnormality in a sensor, abnormality in actuator and the like) is detected, the automatic parking control may be made to be cancelled. Furthermore, when abnormality is detected, the automatic parking control is cancelled and an emergency braking instruction is sent to the brake system so as to automatically stop the vehicle.

Furthermore, while in the embodiments, the invention is described as being applied to the electric power steering system, the invention can be widely applied to vehicle steering systems in which a steering actuator is provided for imparting a steering force to a steering mechanism of a vehicle. These vehicle steering systems include a so-called steer-by-wire system, a hydraulic power steering system and the like. The steer-by-wire system means a system in which a mechanical connection between a steering mechanism and a control member such as a steering wheel or the like is eliminated, so that a manipulating amount of the control member is detected by a sensor and a driving force of a steering actuator which is controlled according to an output from the sensor is transmitted to the steering mechanism. In the steer-by-wire system, although the control member is not always linked with the steering mechanism while automatic steering control is in operation, the control member is preferably made to be linked with the steering mechanism even during automatic steering control in order to have a state in which the position of the control member (for example, the manipulating angle of the steering wheel) properly corresponds to the position of the steering mechanism (the manipulating angle) when the automatic steering control is cancelled.

In addition, while in the embodiments, the automatic parking control is raised as the example of the automatic steering control, the invention can also be applied to other types of automatic steering controls such as an automatic steering control for causing a vehicle to be driven automatically along a driving lane.

The embodiments described above are to be regard as illustrative rather than restrictive. Variations and changes may be made by others, and equivalents employed, without departing from spirit of the present invention. Accordingly, it is intended that all variations, changes and equivalents which fall within the spirit and scope of the present invention as defined in the claims be embraced thereby.

The invention claimed is:

1. A vehicle steering system comprising:
   a steering mechanism including a steering part connected to at least one vehicle wheel to steer the vehicle, and a control member to be manipulated by the driver to control the steering part;
   a steering actuator for imparting a steering force to the steering mechanism;
   an automatic steering controller for performing an automatic steering control by controlling the steering actuator;
   a driving state detector for detecting a driving state of the vehicle during the automatic steering control, wherein the detected driving state includes an angular velocity of the control member;
   a torque detector that detects a manipulating torque applied to the control member;
   torque threshold value setting means for variably setting a torque threshold value for permitting an intervention in the automatic steering control based on the detected driving state, wherein the torque threshold value setting means determines the torque threshold value so as to become smaller as the detected angular velocity of the control member becomes faster; and
   automatic steering intervention means for intervening in the automatic steering control when the manipulating torque detected by the torque detector exceeds the torque threshold value set by the threshold value setting means,
   whereby the automatic steering intervention means intervenes in the automatic steering control at a lower detected torque for faster detected angular velocities of the control member.

2. The vehicle steering system according to claim 1, wherein the automatic steering intervention means includes an operation speed limiting means for intervening in the automatic steering control in the case that the detected angular velocity of the control member exceeds a predetermined angular velocity threshold value and limiting the angular velocity of the control member to be equal to or lower than the angular velocity threshold value.

3. The vehicle steering system according to claim 2, wherein the operation speed limiting means intervenes in the automatic steering control and limits the angular velocity of the control member to be equal to or lower than the angular velocity threshold value when the manipulating torque detected by the torque detector exceeds the torque threshold value set by the threshold value setting means in the case that a detected angular velocity of the control member exceeds the angular velocity threshold value.

4. A vehicle steering system according to claim 2 or 3, wherein the automatic steering intervention means cancels the automatic steering control when the manipulating torque detected by the torque detector exceeds the torque threshold value set by the threshold value setting means in the case that the detected angular velocity of the control member is lower than the angular velocity threshold value.

* * * * *